US012754795B2

(12) United States Patent
Papa

(10) Patent No.: US 12,754,795 B2
(45) Date of Patent: Oct. 6, 2026

(54) PROTECTION IN ASYNCHRONOUS FINITE STATE MACHINE

(71) Applicant: STMicroelectronics International N.V., Geneva (CH)

(72) Inventor: Enrico Papa, Arvier (IT)

(73) Assignee: STMicroelectronics International N.V., Geneva (CH)

( * ) Notice: Subject to any disclaimer, the term of this patent is extended or adjusted under 35 U.S.C. 154(b) by 110 days.

(21) Appl. No.: 18/738,737

(22) Filed: Jun. 10, 2024

(65) Prior Publication Data

US 2025/0377970 A1 Dec. 11, 2025

(51) Int. Cl.
*G06F 11/00* (2006.01)
*G06F 11/07* (2006.01)

(52) U.S. Cl.
CPC ...... *G06F 11/0793* (2013.01); *G06F 11/0736* (2013.01); *G06F 11/079* (2013.01)

(58) Field of Classification Search
CPC . G06F 11/0793; G06F 11/0736; G06F 11/079
See application file for complete search history.

(56) References Cited

U.S. PATENT DOCUMENTS 4,896,296 A * 1/1990 Turner ............ H03K 19/17744 365/189.08
5,350,407 A * 9/1994 McClure ............ A61N 1/37512 607/16
5,388,225 A * 2/1995 Cantrell ............ G06F 13/4068 326/46
5,539,786 A * 7/1996 Snelgrove ............ H04L 7/033 375/373
5,826,106 A * 10/1998 Pang ............ G06F 13/28 710/25
6,137,324 A * 10/2000 Chung ............ H03K 17/223 327/143
6,339,833 B1 1/2002 Guo
(Continued)

OTHER PUBLICATIONS

Fernández, Daniel, et al., "An Asynchronous Finite State Machine Controller for Integrated Buck-Boost Power Converters in Wideband Signal-Tracking Applications," Jun. 13, 2008, In 2008 IEEE International Symposium on Circuits and Systems, pp. 2210-2213.
(Continued)

*Primary Examiner* — Joshua P Lottich
(74) *Attorney, Agent, or Firm* — Slater Matsil, LLP

(57) ABSTRACT

According to an embodiment, a protection circuit for an asynchronous finite state machine (AFSM) circuit is proposed. The protection circuit includes a state decoder configured to generate a first state error signal in response to detecting a state fault condition associated with the AFSM circuit; a fault de-glitch subcircuit configured to receive the first state error signal and generate a second state error signal in response to the first state error signal being asserted for a duration greater than a predetermined threshold; and a set/reset register configured to generate a pulsed reset signal in response to the second state error signal being generated by the fault de-glitch subcircuit, the pulsed reset signal being asserted for a predetermined duration, and wherein the pulsed reset signal causes the AFSM circuit to be reset to a reset or idle condition.

20 Claims, 5 Drawing Sheets

(56) References Cited

U.S. PATENT DOCUMENTS

| | | | | |
|---|---|---|---|---|
| 6,665,818 | B1 * | 12/2003 | Dickey | G06F 11/079 714/E11.026 |
| 8,912,829 | B1 * | 12/2014 | Ogden | G06F 1/24 327/143 |
| 2007/0009066 | A1 * | 1/2007 | Fredriksson | H03L 7/0995 375/326 |
| 2008/0315912 | A1 * | 12/2008 | Satsukawa | H03K 19/20 327/202 |
| 2009/0319821 | A1 | 12/2009 | Tyrrell | |
| 2013/0207800 | A1 * | 8/2013 | Vilela | B60W 50/0205 340/501 |
| 2013/0214813 | A1 * | 8/2013 | Singh | H03K 19/096 326/36 |
| 2013/0259146 | A1 | 10/2013 | Mangano | |
| 2015/0236689 | A1 * | 8/2015 | Mandal | G06F 1/28 327/143 |
| 2017/0293516 | A1 * | 10/2017 | Baca | G06F 11/0724 |
| 2019/0013281 | A1 * | 1/2019 | Elenes | H03G 3/20 |
| 2021/0096592 | A1 * | 4/2021 | Hanschke | H04L 7/0037 |
| 2021/0208189 | A1 * | 7/2021 | Flores | G01R 31/2803 |
| 2022/0077956 | A1 * | 3/2022 | Watanabe | H04L 7/0008 |
| 2022/0253358 | A1 * | 8/2022 | Meunier | G06F 11/1441 |
| 2023/0129868 | A1 | 4/2023 | Tripodi | |
| 2023/0259418 | A1 * | 8/2023 | Baeurle | G06F 11/0745 714/24 |
| 2023/0259433 | A1 | 8/2023 | Dimroci | |
| 2023/0260576 | A1 * | 8/2023 | Fantini | G11C 16/30 365/185.24 |
| 2023/0269168 | A1 * | 8/2023 | Yang | H04L 45/026 |
| 2024/0171453 | A1 * | 5/2024 | Athalye | H04W 76/18 |
| 2024/0322671 | A1 * | 9/2024 | Bergo | H02M 1/32 |
| 2024/0419333 | A1 * | 12/2024 | He | G06F 3/0689 |

OTHER PUBLICATIONS

Marshall, Alan et al., "The Design of An Asynchronous Communications Chip," IEEE Design & Test of Computers 11.2, Final Version to Appear in IEEE Design & Test, Special Issue on Asynchronous Design, Jun. 1994, HP/Stanford Bay Area Science Center, Hewlett-Packard Laboratories, 20 pages.

Pedroni, Volnei A. et al., "Introducing Deglitched-Feedback plus Convergent Encoding for Straight Hardware Implementation of Asynchronous Finite State Machines," IEEE, In 2015 IEEE International Symposium on Circuits and Systems (ISCAS), May 24, 2015, pp. 2345-2348.

* cited by examiner

PROTECTION IN ASYNCHRONOUS FINITE STATE MACHINE

TECHNICAL FIELD

The present disclosure generally relates to electronic devices and, in particular embodiments, to protection in an asynchronous finite state machine (AFSM).

BACKGROUND

Asynchronous Finite State Machines (AFSMs) differ from their synchronous counterparts in that transitions between states occur not as a result of clocked events but in response to the levels of input and internal signals. Unlike typical Finite State Machines (FSM) that rely on clock or signal edges for state evolution, AFSMs utilize a request/acknowledge mechanism to manage state transitions asynchronously. This allows AFSMs to offer certain benefits over synchronous FSMs, including heightened responsiveness to variations in input and reduced power consumption. However, AFSMs can be susceptible to issues arising from signal spikes, noise, and fluctuations in power supply, which can compromise their stability compared to synchronous FSMs.

SUMMARY

Technical advantages are generally achieved by embodiments of this disclosure, which describe protection in an asynchronous finite state machine (AFSM).

A first aspect relates to a protection circuit for an asynchronous finite state machine (AFSM) circuit. The protection circuit includes a state decoder configured to generate a first state error signal in response to detecting a state fault condition associated with the AFSM circuit; a fault de-glitch subcircuit configured to receive the first state error signal and generate a second state error signal in response to the first state error signal being asserted for a duration greater than a predetermined threshold; and a set/reset register configured to generate a pulsed reset signal in response to the second state error signal being generated by the fault de-glitch subcircuit, the pulsed reset signal being asserted for a predetermined duration, and wherein the pulsed reset signal causes the AFSM circuit to be reset to a reset or idle condition.

A second aspect relates to a method for operating an asynchronous finite state machine circuit. The method includes monitoring a state fault condition associated with the AFSM circuit, wherein a state fault condition corresponds to no state being asserted within the AFSM circuit or more than one state simultaneously being asserted within the AFSM circuit; monitoring an output fault condition associated with the AFSM circuit, wherein an output fault condition corresponds to a prohibited output being generated by the AFSM circuit; and generating a pulsed reset signal in response to detecting a state fault condition for a duration greater than a predetermined threshold, detecting an output fault condition, or a combination thereof, and wherein the pulsed reset signal causes the AFSM circuit to be reset to a reset or idle condition.

A third aspect relates to a system that includes an asynchronous finite state machine (AFSM) circuit comprising a plurality of states; and a protection circuit coupled to the AFSM circuit, the protection circuit comprising: a state decoder configured to generate a first state error signal in response to detecting a state fault condition associated with the AFSM circuit, a fault de-glitch subcircuit configured to receive the first state error signal and generate a second state error signal in response to the first state error signal being asserted for a duration greater than a predetermined threshold, and a set/reset register configured to generate a pulsed reset signal in response to the second state error signal being generated by the fault de-glitch subcircuit, the pulsed reset signal being asserted for a predetermined duration, and wherein the pulsed reset signal causes the AFSM circuit to be reset to a reset or idle condition.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
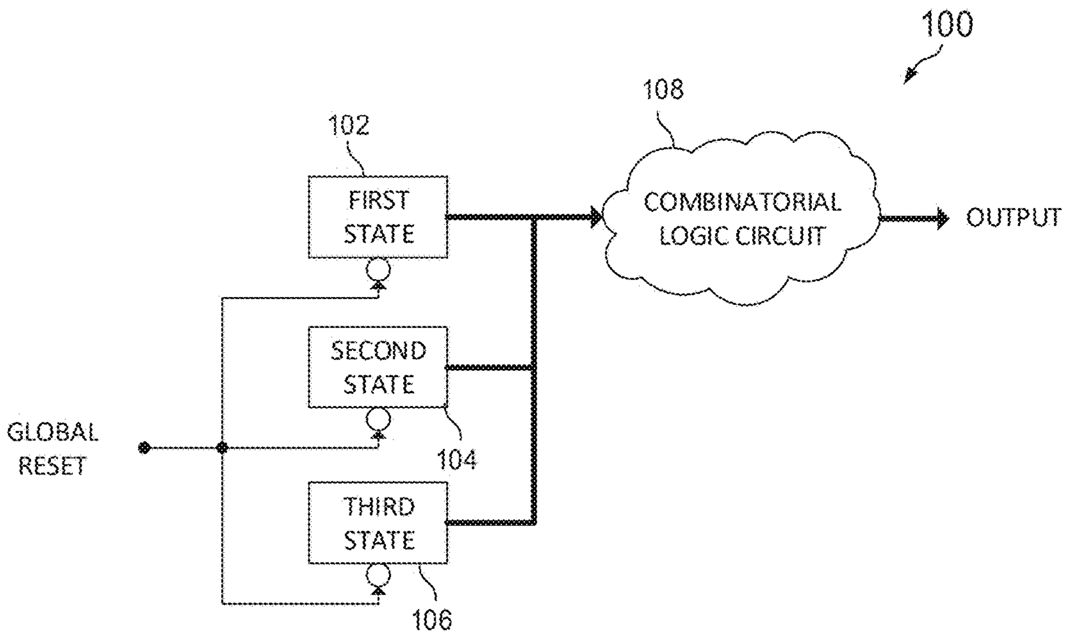
FIG. 1 is a block diagram of an embodiment AFSM circuit.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a one-hot coded Asynchronous Finite State Machine (AFSM) architecture, it should also be appreciated that they may also apply to other AFSM architectures. In contrast to synchronous FSMs, which have a well-established architecture and can be constructed using a standardized digital workflow with specialized development tools, AFSMs generally lack a uniform development process or a commonly accepted implementation architecture. Accordingly, embodiments disclosed herein may also apply to other architecture types related to an AFSM circuit.

In embodiments, an implementation of an AFSM architecture is characterized by one-hot state transitions facilitated by an asynchronous request and acknowledge mechanism. This approach eschews the use of registers. Instead, it employs a proprietary library comprising combinatorial logic cells and arbitration elements to resolve conflicts arising from concurrent requests. A feature of this design is that the "old state" is maintained until the "new state" is fully established, resulting in a brief overlap of states during each transition.

In an AFSM where states are encoded using one-hot coding—a method where each state of the AFSM is represented by a distinct cell with its unique binary code—there exists a vulnerability to noise interference. With N states, the AFSM employs N cells, with each cell dedicated to a specific state. The injection of noise or an unexpected spike can disrupt the state of an individual cell by inadvertently setting or resetting it. Should an additional cell be erroneously set due to noise, the one-hot coding scheme can be compromised, leading to unpredictable behavior in the AFSM's state progression and its corresponding outputs. This unpredictability can cause outputs to behave erratically, posing a potential risk to the machine's intended operation.

Similarly, suppose a spike resets the cell that represents the current state. In that case, the integrity of the one-hot coding can again be violated, resulting in a lack of a defined active state. Consequently, this prevents the AFSM from transitioning to any future state, effectively causing the machine to enter a deadlock situation. In this deadlock state, output signals may become stuck in an unintended configuration that could be hazardous to the application relying on the AFSM.

Solutions for mitigating the risk of unpredictable state transitions in traditional Finite State Machines (FSMs) have been developed. In an FSM, where the state is coded with N bits, and there are M required states, the actual number of possible states is $2^N$ due to the binary nature of the encoding. Therefore, for M states that are less than or equal to $2^N$, there exists a set of undefined or "uncharted" states equal to $2^N-M$. These undefined states are not part of the intended state machine design. Thus, it can pose a risk for the hardware to enter an unpredictable or undesired condition. However, strategies have been devised in FSMs to manage these uncharted states, such as using hardware description language (HDL) to program safe fallbacks. For example, if an FSM inadvertently enters an uncharted state, HDL stipulations can guide the hardware to revert to a predefined idle or reset state to restart the machine safely.

This precautionary measure, however, does not apply to AFSMs. An AFSM's one-hot coding implies that N (the number of bits used to represent each state) equals M (the total number of states), as each state uniquely and independently represents its bit within the system. Consequently, with N=M, the number of uncharted states becomes significantly larger than an FSM with the same number of intended states. Moreover, due to fundamental differences in hardware architectures, AFSMs do not offer the possibility of incorporating additional HDL-programmed state transitions during the development phase to safely navigate toward a known state when an uncharted state is encountered.

As a result, no established solution is currently available for handling the transition to uncharted states when the one-hot state condition is violated. This represents a unique challenge in ensuring the reliable and safe operation of AFSMs within their applications.

In embodiments, the present disclosure proposes restoring an AFSM's functionality when it encounters malfunction due to noise or other disturbances that can result in unintended state transitions. In embodiments, the proposed solution involves applying a short pulse to the Reset input of the AFSM, which forces the AFSM to enter an idle or reset state. From this state, the AFSM can safely restart and resume normal operation.

Unlike traditional Finite State Machines, transitions to the idle or reset state in an AFSM cannot be induced through regular state transitions when its one-hot state encoding is compromised; instead, direct intervention is required via the Reset input. Due to an AFSM's absence of a clock signal and the non-synchronous nature of state changes, any restoration mechanism must also be asynchronous to align with the AFSM's architecture. It should be noted that the transition to a reset state is normally possible but not when AFSM's normal one-hot state encoding is compromised.

Aspects of this disclosure encompass monitoring mechanisms for both the outputs and the state cells of an AFSM, with the ability to act upon the Reset input whenever a malfunction within the AFSM is detected. Advantageously, by integrating such a hardware protection system into the AFSM design, its robustness against noise, external disturbances, and input glitches is enhanced. This ensures that, despite operating asynchronously and lacking a clock signal to guide transitions, the AFSM can maintain reliable performance and recover from errors that may compromise its intended function. These and additional details are further detailed below.

FIG. 1 illustrates a block diagram of an embodiment AFSM circuit 100. AFSM circuit 100 includes a first state 102, a second state 104, a third state 106, and a combinatorial logic circuit 108, which may (or may not) be arranged as shown. AFSM circuit 100 is shown with three states and a single combinatorial logic circuit; however, it should be appreciated that the number of states and the arrangement of the AFSM circuit 100 is non-limiting, and other arrangements are similarly contemplated.

In the AFSM circuit 100, components, such as the input network, the mechanism for handling state transitions, the accompanying request and acknowledge features, and various other associated circuits, are not depicted. These elements are omitted from the detailed description for the sake of brevity of the discussion. While the methods by which the AFSM circuit 100 transitions between states are not covered in detail, the discussion is focused on how the AFSM circuit 100 progresses from one state to the next.

A typical FSM circuit operates under binary encoding. For example, in a typical synchronous state machine with 16 states, these states can be encoded using a 4-bit binary bus, where each bit combination—ranging from 0000 to 1111—represents a unique state from the first to the sixteenth state. This binary code allows the synchronous machine to determine its state by which bits are '1' or '0'.

However, in an asynchronous state machine, such as the AFSM circuit 100, instead of binary encoding, each state is represented by a separate physical cell. In one-hot coding, only one cell is active at any given time, corresponding to the current active state of the machine. If there are 16 states in this machine, there would need to be 16 individual physical cells, each representing a state (in FIG. 1, the AFSM circuit 100 includes three individual physical cells). Activating a single cell indicates the machine is in that particular state.

Multiple active cells at once would suggest an error because, unlike a binary bus that can represent various states with the same bits, one-hot coding allows for only one active state at any time. This means that a one-hot encoded asynchronous state machine with 16 cells does not have the 216 states that its binary equivalent might suggest, but rather precisely 16 possible states.

Further, AFSM circuit 100 is distinct from its synchronous counterpart because it operates without a clock. This lack of synchronization with a clock signal means the AFSM circuit 100 reacts to input levels rather than clock edges, making the machine sensitive to unexpected input glitches and noise. Such sensitivity can result in unintended state transitions that can compromise its operation. Despite these challenges, AFSM circuit 100 offers a speed advantage due to the absence of clock-related delays. While AFSM circuit 100 can be more efficient, it presents robustness issues concerning noise and glitches that can cause the AFSM circuit 100 to experience unwanted behavior without a clear recovery path.

Like all finite state machines, AFSM circuit 100 includes multiple states 102, 104, and 106. Each state is 'one-hot' coded, which means each physical cell state within the machine corresponds to a unique state in the diagram. Transitioning from one state to another is managed via request and acknowledge mechanisms, ensuring that only one state of the potential three states is active at any moment. To move to a subsequent state, the machine asserts the next state and, once achieved, resets the previous state.

In embodiments, AFSM circuit 100 operates on the principle of asynchronous control logic, such that the input signals trigger state transitions. In AFSM circuit 100, each state is distinctly represented through a one-hot encoding scheme utilizing, for example, three flip-flops or equivalent storage elements. Only one of these elements is active (having a value of 1) in any given state, ensuring a clear and exclusive indication of the current state.

The combinatorial logic circuit 108, interconnected with the state representation elements, processes the combination of inputs and the present state to generate the outputs of the AFSM circuit 100. The logic outputs are a function of the actual state and the input level. Based on the current inputs and states, the logic outputs signal the new action on the circuits controlled by the AFSM circuit 100.

In embodiments, transitions between states in the AFSM circuit 100 are event-driven; they occur asynchronously in response to changes in input signals. When the AFSM circuit 100 determines that a transition condition is met, a request signal prompts the move to the next appropriate state. An acknowledge signal is used with the request signal as part of a handshake protocol to ensure orderly progression and synchronization without a clock. This ensures that each transition is completed before any subsequent actions are undertaken.

A protective measure has been proposed to safeguard the operation of the AFSM circuit 100 against a broad array of potential disruptions. AFSM circuit 100, known for its rapid state transitions, is particularly vulnerable to unpredictable disturbances such as glitches, noise, crosstalk, or an unstable power supply. Such disruptions can adversely affect the performance of the AFSM circuit 100, which might be employed in critical components like a DC-DC converter.

In devices like DC-DC converters, where swift and numerous state transitions are necessary to manage the switching operations across a power bridge, the AFSM circuit 100 is expected to operate reliably even in the presence of a high-frequency clock that can be on the order of 1 megahertz. Given the frequent switching cycles and the potential for prolonged periods of operation, there is a feasible risk that the AFSM circuit 100 could experience disturbances.

The proposed protection is designed to ensure that despite the inherent speed and complexity of the AFSM circuit 100 within a context like that of a DC-DC converter, it remains robust against these disturbances. The protective mechanism is intended to maintain the integrity of the machine's functionality even when faced with unforeseen electrical anomalies, securing the uninterrupted and accurate operation of the state transitions fundamental to the purpose of the AFSM circuit 100.

Figure 2:
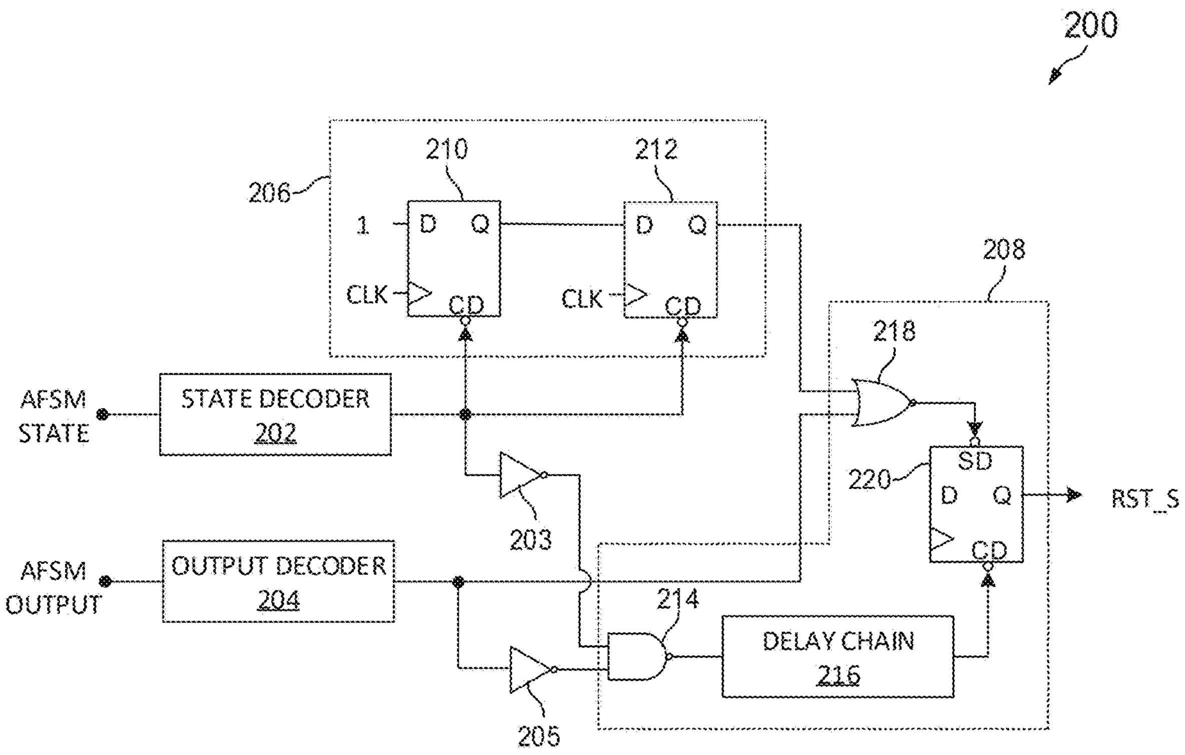
FIG. 2 is a block diagram of an embodiment protection circuit for AFSM circuit.

FIG. 2 illustrates a block diagram of an embodiment protection circuit 200 for AFSM circuit 100. The protection circuit 200 includes a state decoder 202, a first inverter 203, an output decoder 204, a second inverter 205, a fault de-glitch subcircuit 206, and a set/reset register 208, which may (or may not) be arranged as shown. The fault de-glitch subcircuit 206 includes a first flip-flop 210 and a second flip-flop 212. The set/reset register 208 includes a NAND gate 214, a delay chain 216, a NOR gate 218, and a third flip-flop 220. The protection circuit 200 may include additional components that are not shown.

In embodiments, the state decoder 202 includes a pair of outputs configured to provide complementary signals, wherein one output is the logical inverse of the other. Here, in a non-limiting example, this function is provided by the first inverter 203.

In embodiments, the output decoder 204 includes a pair of outputs configured to provide complementary signals, wherein one output is the logical inverse of the other. Here, in a non-limiting example, this function is provided by the second inverter 205.

The protection circuit 200 is configured to monitor the state of the AFSM circuit 100 and its outputs through the state decoder 202 and the output decoder 204. In response to detecting a malfunction in the AFSM circuit 100, the protection circuit 200 is configured to generate an asynchronous pulsed recovery reset signal (RST_S) at the output of the set/reset register 208 to restart the AFSM circuit 100 in a safe condition, such as in the idle or reset state.

It is noted that during each transition within the AFSM circuit 100, the process initiates in one state and progresses to the subsequent state while resetting the antecedent state. Consequently, a transitory phase exists where both the succeeding and the antecedent states are concurrently active (the antecedent state is deactivated once the succeeding state is fully active). Therefore, even though the AFSM circuit 100 adheres to one-hot coding standards, a brief duration emerges in which two states—the antecedent and the imminent—are simultaneously operational. Specifically, each time the AFSM circuit 100 undergoes a state transition, this overlap of states manifests for a relatively brief period, typically ranging from hundreds of picoseconds to a few nanoseconds, with the duration contingent on the underlying technology.

Accordingly, it would be inaccurate to hastily diagnose the presence of two concurrent active states as indicative of the AFSM circuit 100 malfunctioning. Therefore, in embodiments, a fault de-glitch subcircuit 206 is suggested to preclude incorrect triggering caused by the short-lived concurrent activation of preceding and subsequent states. The fault de-glitch subcircuit 206 is configured to manage this transitory condition effectively.

The fault de-glitch subcircuit 206 effectively filters out acceptable transitions within the AFSM circuit 100. In embodiments, the filtering is achieved through a constantly operational external clock (CLK) and a series of D flip-flops connected in series. When states are determined to be at fault, the reset of the two flip-flops in question is released. If the fault persists throughout two consecutive rising edges of the clock signal (CLK), it indicates a fault condition.

The transition times between states of the AFSM circuit 100 are fairly consistent, with each transition typically not exceeding, for example, 50 nanoseconds. In embodiments, the duration is based on the longest or critical path identified by analyzing the machine's functioning. Consequently, if a clock with a period greater than 50 nanoseconds is used in such a scenario, it would be sufficient to filter out the potential transient fault condition. This clock frequency can be selected based on specific requirements; a higher frequency will detect faults faster, whereas a lower frequency will slow detection. However, the chosen frequency must not be less than the time required for the state transitions to avoid impairing the transition detection mechanism.

An input of the state decoder 202 is configured to receive the current state of the AFSM circuit 100. The one-hot state coding of the AFSM circuit 100 ensures that the state decoder 202 outputs a fault at its output under two specific conditions: if more than one state is asserted simultaneously or if no state is asserted. The first condition can arise due to noise or glitches (apart from the aforementioned process, a brief overlap of states is active during state transitions). The second condition arises where no state is set—possibly due to the actual state being erroneously cleared by noise—this results in a condition known as a deadlock, in which no state overlap occurs.

In embodiments, the fault de-glitch subcircuit 206 is configured to address state overlap during state transitions within AFSM circuit 100. As previously noted, if the state overlap persists beyond the norm, multiple states may appear active simultaneously, which can signal a false fault condition within the AFSM circuit 100.

Regardless of the reason for the error detection by the state decoder 202, if an error is detected, the state decoder 202 will prompt the output of a fault signal at a first output coupled to the "Clear Direct" (CD) inputs of the first flip-flop 210 and the second flip-flop 212 of the fault de-glitch subcircuit 206. In response to detecting an error, the state decoder 202 asynchronously de-asserts the reset of the first flip-flop 210 and the second flip-flop 212 so that the output (Q) of the second flip-flop 212 is at a logic level high after two clock events.

In contrast, if the state decoder 202 does not detect an error, the state decoder 202 asynchronously resets the first flip-flop 210 and the second flip-flop 212, immediately clearing their outputs (Q) and setting them to their reset state. Further, to counteract the overlap during state transitions and mitigate potential errors, the fault de-glitch subcircuit 206 includes the first flip-flop 210 coupled to the second flip-flop 212. The first flip-flop 210 and the second flip-flop 212 are synchronized with a clock whose period is deliberately selected to be greater—by a margin—than the expected length of the normal state overlap.

In embodiments, the clock signal (CLK) provided to the first flip-flop 210 and the second flip-flop 212 is any available clock within the device that hosts the AFSM circuit 100 that may be utilized for the purposes described, even if it is not directly linked to the machine's operations. For example, a clock signal is present in switching applications, which could be employed for additional functions even though the AFSM circuit 100 does not require a clock for its core activities. The frequency of this clock signal (CLK) need not be correlated with the operation or frequency of the AFSM circuit 100. Instead, it provides a filtering function for the fault de-glitch subcircuit 206, independent of the asynchronous behavior of the AFSM circuit 100.

The output of the state decoder 202 is inverted through the first inverter 203, which is coupled to the NAND gate 214. Accordingly, when the state decoder 202 detects an error, the output coupled to the fault de-glitch subcircuit 206 is at a logic level high, and the output of the first inverter 203 coupled to a first input of the NAND gate 214 of the set/reset register 208 is at a logic level low. Conversely, in the absence of error detection by the state decoder 202, the output coupled to the fault de-glitch subcircuit 206 is at a low logic level, and the output of the first inverter 203 is at a high logic level.

The output decoder 204 is coupled to the output of the AFSM circuit 100 to receive signals emanating from the combinatorial logic circuit 108 of the AFSM circuit 100. It is configured to monitor the output of the AFSM circuit 100 for specific combinations considered prohibited or critical to the application's operation. If the output decoder 204 identifies such an output, it is programmed to generate an error signal at its output, coupled to the NOR gate 218 of the set/reset register 208.

Further, the output decoder 204 is coupled to the second inverter 205. Accordingly, when the output decoder 204 detects an error, the output coupled to NOR gate 218 of the set/reset register 208 is at a high logic level and the output of the second inverter 205 is at a low logic level. Conversely, in the absence of error detection by the output decoder 204, the output coupled to NOR gate 218 of the set/reset register 208 is at a low logic level, and the output of the second inverter 205 is at a high logic level. Activating the error signal at the output of the output decoder 204 prompts the set/reset register 208 to initiate an AFSM recovery reset process.

The set/reset register 208 is configured to produce an asynchronous pulsed recovery reset signal (RST_S) with a specified width. The set/reset register 208 is activated (set) when a fault in the state or output is identified by the state decoder 202 or the output decoder 204. The asynchronous pulsed recovery reset signal (RST_S) is maintained until the AFSM circuit 100 reaches a reset state condition—or any other pre-programmed safe state—together with an output that indicates safety, signaling that the AFSM circuit 100 has been appropriately restarted.

To ensure that the asynchronous pulsed recovery reset signal (RST_S) spans a minimum desired width, a delay chain 216 with a programmable length is utilized. This arrangement allows for the precise control of the duration of the asynchronous pulsed recovery reset signal (RST_S), thereby guaranteeing that the AFSM circuit 100 has sufficient time to return to a secure operating condition.

In response to detecting an error by the state decoder 202 for the length of a typical transition from one state to another state at the output of the fault de-glitch subcircuit 206, detecting an error by the output decoder 204, or both, the set-direct (SD) input of the third flip-flop 220 is set to a logic low state. In response to the SD input being activated (logic high in positive logic, or logic low in negative logic), it forces the output (Q) of the third flip-flop 220 to a high logic state. The SD input is asynchronous, meaning it takes effect immediately without waiting for a clock signal. By forcing the output (Q) of the third flip-flop 220 to a logic high state, the asynchronous pulsed recovery reset signal (RST_S) is asserted and the AFSM circuit 100 is reset.

Once the AFSM circuit 100 is reset, the state decoder 202 and the output decoder 204 no longer detect an error state. As such, the inputs to the NAND gate 214 from each decoder are at a logic high state, resulting in the output of the NAND gate 214 being at a logic low state. The output of the NAND gate 214 is fed to the delay chain 216 with the programmable length. The output of the delay chain 216 transitions from a logic high state to a logic low state after passing the programmable length, which is fed to the CD input of the third flip-flop 220. This results in the asynchronous pulsed recovery reset signal (RST_S) being de-asserted and the AFSM circuit 100 starting operation from the reset state.

In embodiments, the delay chain 216 allows the device hosting the AFSM circuit 100 to reach a stable and safe state following a reset operation. For example, there may be a preference for confirming that the AFSM circuit 100 is in this secure condition before normal operations resume. Although the current states and outputs may appear reliable immediately following the reset, there may still be transient switching activities within the internal traces of the host device. To mitigate any risks associated with these potential internal changes, a delay chain 216 may be incorporated in some embodiments to maintain the reset state for a brief period, such as for several nanoseconds. This additional time can allow for the cessation of any internal switching, providing an added assurance of system stability and safety.

Figure 3:
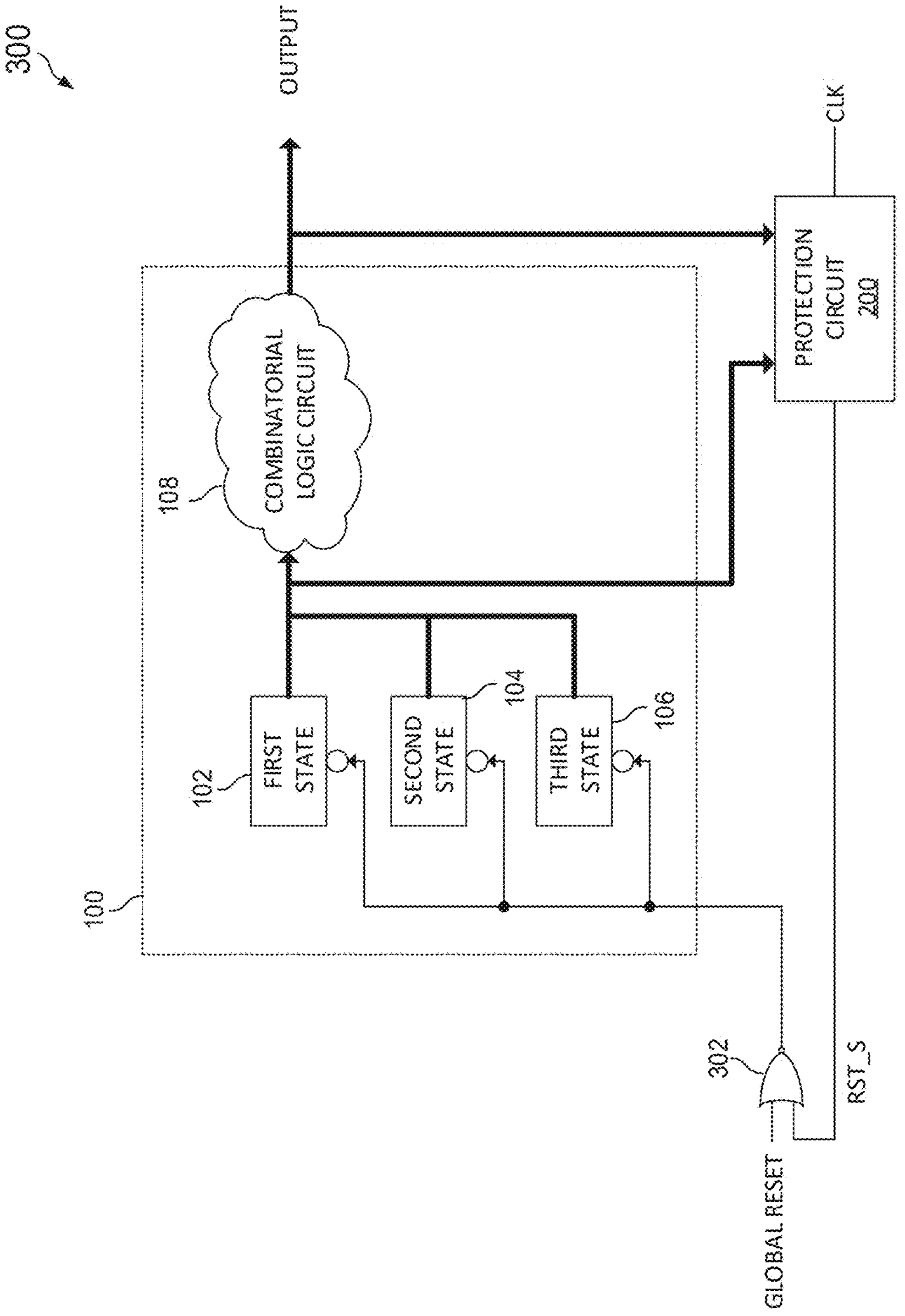
FIG. 3 is a block diagram of an embodiment system.

FIG. 3 illustrates a block diagram of an embodiment system 300. System 300 includes the AFSM circuit 100, the protection circuit 200, and a NOR gate 302, which may (or may not) be arranged as shown. System 300 may include additional components not shown, such as a controller or processor for executing instructions, or memory for storing instructions to operate system 300.

System 300 may be any device capable of hosting the AFSM circuit 100. Specifically, the proposed solution can be advantageously implemented in compact, energy-efficient devices utilizing the AFSM circuit 100. For example, system 300 may be implemented in a device incorporated using direct current to direct current (DC/DC) converter products. AFSM circuits are generally advantageous in situations that demand rapid response times without a quick clock, where low power modes are employed, and oscillators are switched off. The effectiveness of the proposed solution is demonstrated by the fact that when a functional aberration is perceived at the application or device level, the device reinitiates from a secure baseline state.

For example, according to the embodiments disclosed herein, if cross-conduction begins within a DC/DC converter, the drivers are shut down instantly. After a brief pause, the device recommences its switching operations.

Here, the architecture of the finite state machines under discussion is not depicted explicitly; the focus is instead on the hardware state cells of a hypothetical three-state machine of the AFSM circuit 100. This machine is conceived to operate within the scope of only three distinct states. Although it does not explicitly illustrate the request and acknowledgment signals typically exchanged between states, let's imagine that a system is in place to monitor the internal conditions of the asynchronous machine.

The protection circuit 200 is configured to monitor the machine's state and its outputs continuously. The outputs, usually generated through the combinatorial logic circuit 108 and based on the state, are key indicators of the machine's performance. If a malfunction is detected, perhaps through an aberration in the expected states or outputs, the protection circuit initiates a recovery sequence by issuing a pulsed reset signal.

This reset is not simply executed in a vacuum; the system ensures that the protection circuit 200 maintains surveillance over the state and output signals during this corrective process. The intention is to hold the reset until clear evidence is that the AFSM circuit 100 has returned to a safe and stable operating condition. It is only after confirming this safe state—evidenced by the regular monitoring of both the states and output signals—that the protection circuit 200 releases the reset, thus resuming the normal operation of the AFSM circuit 100.

The protection circuit 200 generates an asynchronous pulsed recovery reset signal (RST_S) directed to a first input of the NOR gate 302. Meanwhile, the global reset signal for the AFSM circuit 100 is connected to a second input of the same NOR gate 302. The output from NOR gate 302 then goes to the set/reset input of each cell within the AFSM circuit 100. An external controller can assert a global reset signal applied to the second input of NOR gate 302. This global reset conventionally initiates at a logic level high (one), indicating a reset condition at the start of operations. The device begins to operate once the global reset transitions to a low logic level. The AFSM circuit 100 undergoes a reset when the asynchronous pulsed recovery reset signal (RST_S), originating from protection circuit 200, is at a high logic level.

In embodiments, a high pulse is generated to initialize the AFSM circuit 100, which serves as a reset signal. Each state of the AFSM circuit 100 is configured to be reset with an active low signal. Consequently, before it reaches the state cells of the AFSM circuit 100, the high pulse reset signal originating from the protection circuit 200 is inverted. In embodiments, the global reset signal and the asynchronous pulsed recovery reset signal are configured to be active high—the AFSM circuit 100 is reset when either signal is an active high signal.

In embodiments, the AFSM circuit 100 is configured to be reset when either signal is an active low signal (not shown). Accordingly, in an embodiment, the NOR gate 302 can be replaced by an OR gate, and each state of the AFSM circuit 100 is configured to be reset with an active high signal.

All elements with a state, which includes any logic that maintains a state, typically undergo a reset at time zero. Accordingly, the protection circuit 200 is configured to receive the global reset signal at startup (i.e., time zero) to reset the sequential circuits (i.e., flip-flops) within the fault de-glitch subcircuit 206. This ensures that the fault de-glitch subcircuit 206 begins operation from a known safe condition. Activation occurs following this global reset, allowing the system to operate normally. This procedure sets the flip-flops within the fault de-glitch subcircuit 206 to a predetermined, known condition at the onset of operation for reliable functionality.

Figure 4:
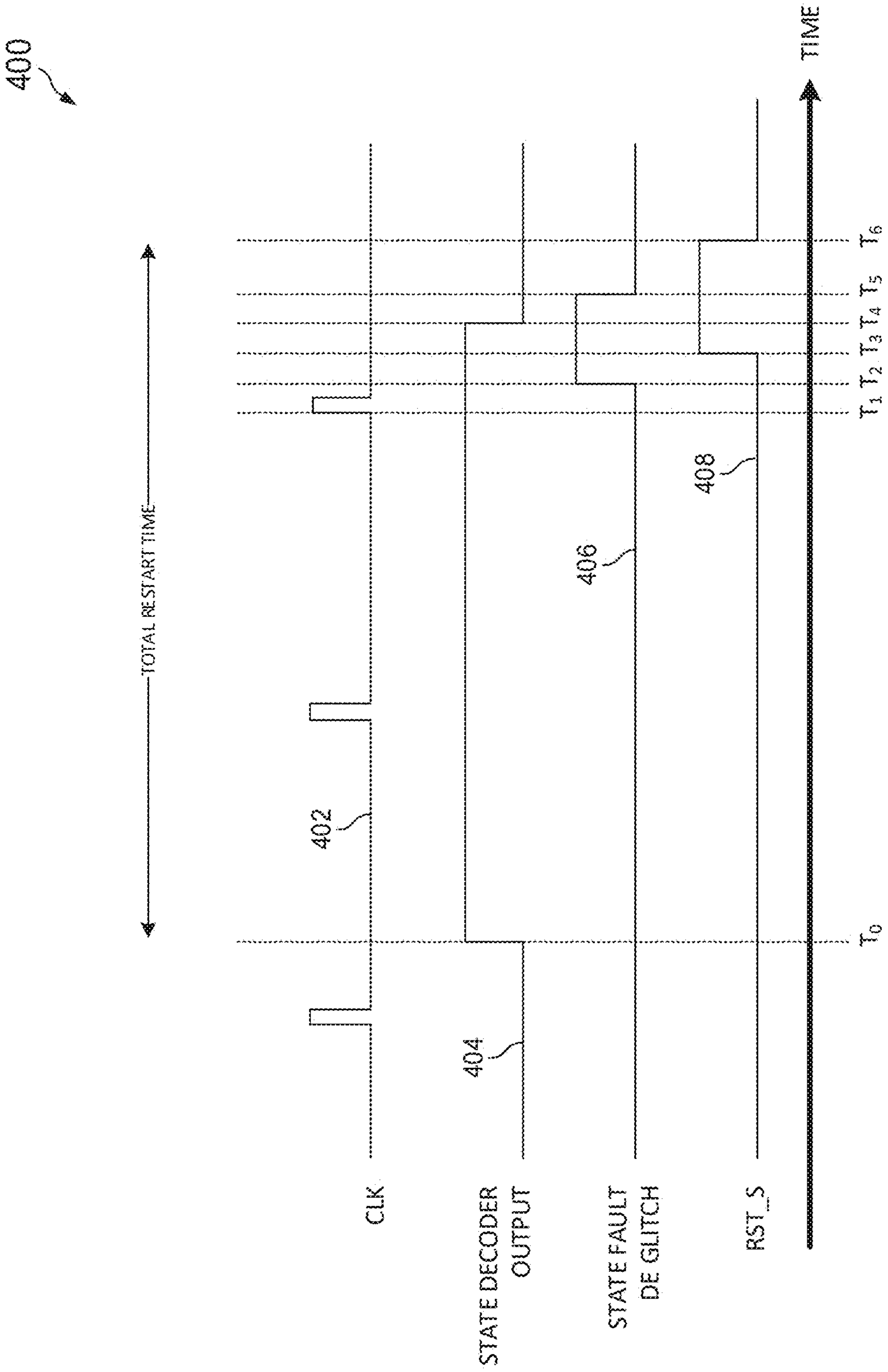
FIG. 4 are timing diagrams of an embodiment operation of the system for state fault conditions.

FIG. 4 illustrates timing diagrams of an embodiment operation of system 300 for state fault conditions. The timing diagrams include a clock signal plot 402, a state decoder output plot 404, a state fault de-glitch plot 406, and a recovery reset signal (RST_S) plot 408.

At time $T_0$, a potential fault corresponding to a state fault condition is detected by the state decoder 202, leading to a condition where two states are asserted simultaneously.

At time $T_1$, after the second clock pulse of the clock signal plot 402, a fault is detected by the fault de-glitch subcircuit 206. Before time $T_1$, the normal overlap of states during transitions is observable, which is typical behavior for state changes in AFSM circuit 100.

At time $T_2$, the output of the fault de-glitch subcircuit 206 goes high. As a result of this extended fault condition, a de-glitched fault flag is activated, signaling the detection of a malfunction in the state decoder output plot 404.

In response, an attempt is made to recover the AFSM circuit 100 by initiating a recovery reset action at time $T_3$. During this period, the AFSM circuit 100 is driven into an idle state, which is its predefined reset state.

Despite this reset action, because the fault is still manifesting as multiple active states at time $T_3$, the reset state is maintained and has yet to be relinquished. At time $T_4$, the AFSM circuit 100 is reset, the injected fault is rectified and the state fault is no longer active.

At time $T_5$, the reset is de-asserted for the AFSM circuit 100. During this period, the AFSM circuit 100 is driven into an idle state, which is its predefined reset state. However, due to the delay chain 216, it remains active. Accordingly, despite the reset action because the fault is still manifesting; the reset state is maintained and has yet to be relinquished.

At time $T_6$, after the delay set by the delay chain 216, the AFSM circuit 100 continues with its normal operation. The resolution allows all states within the AFSM circuit 100 to reset correctly.

The state and output decoders, charged with monitoring the state conditions, acknowledge that the system 300 has achieved a reset and secure status. Consequently, the enforced reset condition is terminated. With the impediments resolved and a stable state re-established, the AFSM circuit 100 can resume its operations from the idle state.

Figure 5:
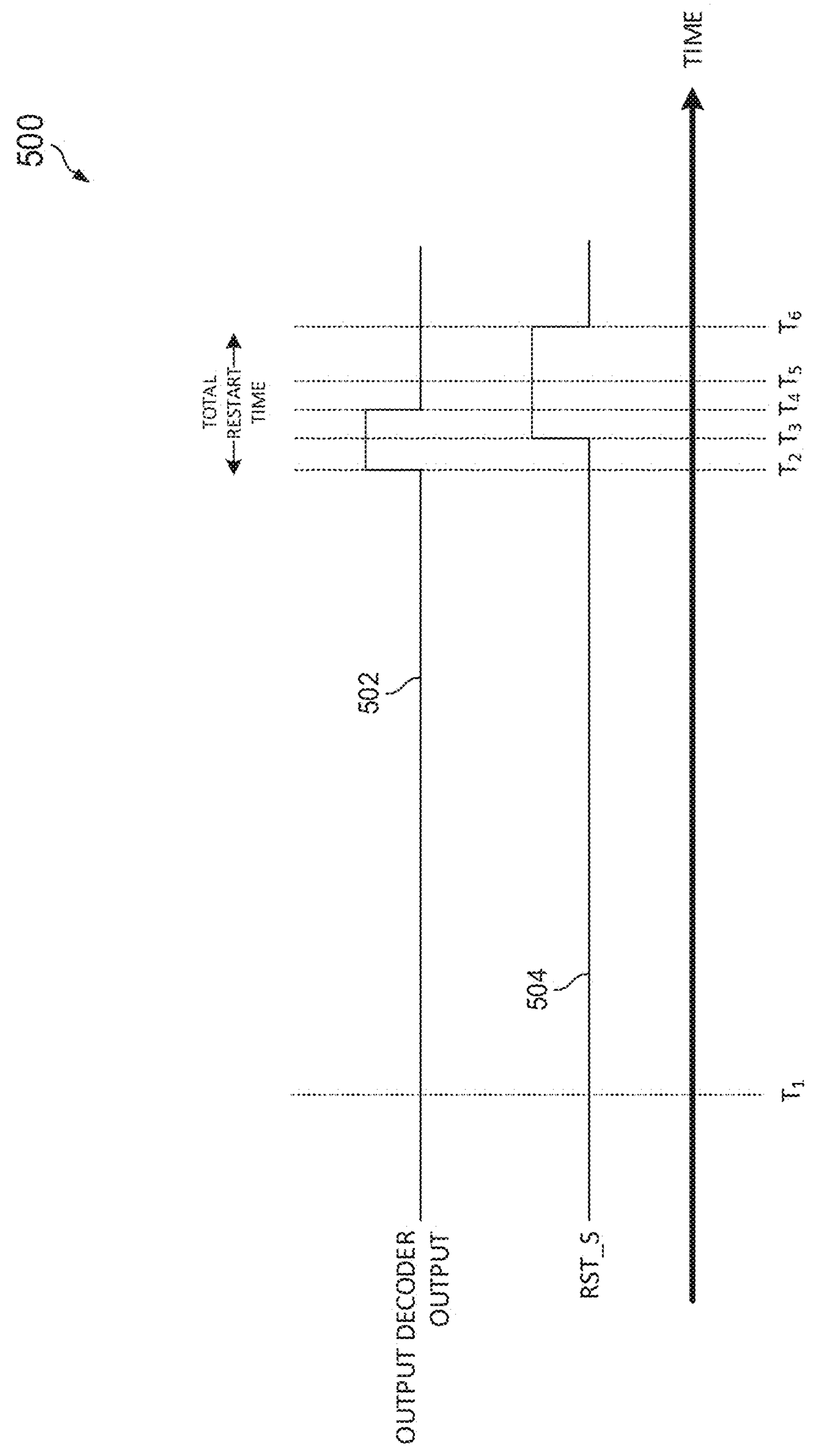
FIG. 5 are timing diagrams of an embodiment operation of the system for output fault conditions.

FIG. 5 illustrates timing diagrams of an embodiment operation of system 300 for output fault conditions. The timing diagrams include an output decoder output plot 502 and a recovery reset signal (RST_S) plot 504. In contrast with the operation outlined in FIG. 4, due to the absence of the fault de-glitch subcircuit 206, the restart time in FIG. 5 from time $T_2$ to time $T_6$ is shorter than the restart time in FIG. 4.

Before time $t_2$, the output decoder had not detected a fault. At time $T_3$, a reset is asserted for the AFSM circuit 100. In embodiments, in response to detecting the fault at time $t_2$, an attempt is made to recover the AFSM circuit 100 by initiating a recovery reset action from time $T_3$ until time $T_4$.

At time $T_4$, the AFSM circuit 100 is reset and the state fault is no longer active.

At time $T_5$, the reset is de-asserted for the AFSM circuit 100. During this period, the AFSM circuit 100 is driven into an idle state, which is its predefined reset state. However, due to the delay chain 216, it remains active. Accordingly, despite the reset action, the reset state is maintained because the fault is still manifesting and has yet to be relinquished.

At time $T_6$, after the delay set by the delay chain 216, the AFSM circuit 100 continues with its normal operation. The resolution allows all states within the AFSM circuit 100 to reset correctly.

The state and output decoders, charged with monitoring the state conditions, acknowledge that the system 300 has achieved a reset and secure status. Consequently, the enforced reset condition is terminated. With the impediments resolved and a stable state re-established, the AFSM circuit 100 can resume its operations from the idle state.

Figure 6:
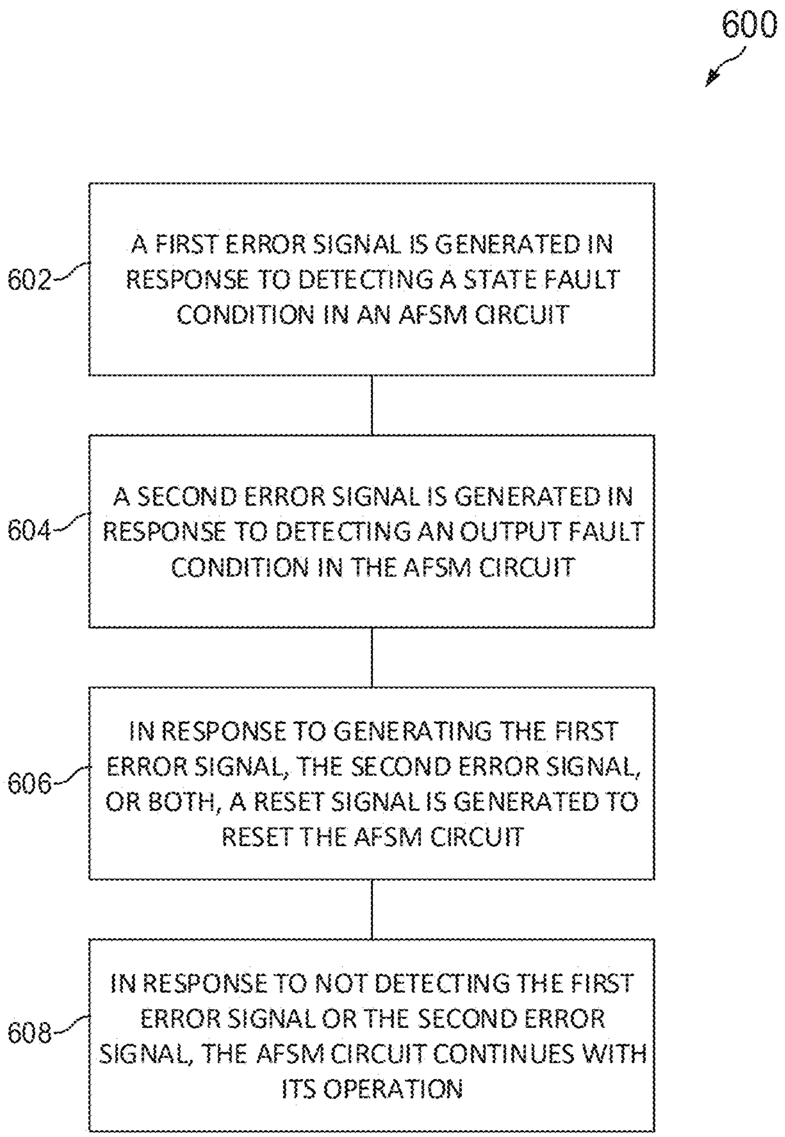
FIG. 6 is a flow chart of an embodiment method for operating the system of FIG. 3.

FIG. 6 illustrates a flow chart of an embodiment method 600 for operating the system 300. It is noted that all steps outlined in the flow chart of method 600 are not necessarily required and can be optional. Further, changes to the arrangement of the steps, removal of one or more steps and path connections, and addition of steps and path connections are similarly contemplated.

At step 602, in response to detecting a state fault at the AFSM circuit 100, a first error signal is generated. In embodiments, the state fault condition corresponds to more than one state being asserted simultaneously within the AFSM circuit 100. In embodiments, the state fault condition corresponds to no state being asserted within the AFSM circuit. In embodiments, the first error signal is asserted if the state fault condition remains after a predetermined duration. The predetermined duration can be equal to or greater than the transition length starting from the transition of AFSM circuit 100 from one state to the next state until the preceding state is inactive and the next state is active. The first error signal is not asserted if the state fault condition is less than the predetermined duration.

At step 604, in response to detecting an output fault at the AFSM circuit 100, a second error signal is generated. In embodiments, the output fault condition corresponds to detecting an output fault condition at the output of the AFSM circuit 100, such as a combinatorial logic circuit 108. In embodiments, the output fault condition corresponds to one or more combinations considered prohibited or critical to the application's operation.

At step 606, in response to generating the first error signal, the second error signal, or both, a protection circuit generates a reset signal. In embodiments, the reset signal is an asynchronous pulsed recovery reset signal. In embodiments, the reset signal has a set duration such that the AFSM circuit 100 is reset and not restarted until the set duration is passed. The reset signal resets the AFSM circuit 100 to an idle or reset state.

At step 608, in the absence of the first error signal and the second error signal, the protection circuit does not assert the reset signal and the AFSM circuit 100 continues with its operation.

In embodiments, the proposed solution maintains the standard operation of the AFSM circuit 100 until a fault is identified. Upon detecting a malfunction, the solution ensures that a reset of sufficient minimum pulse width is applied to the AFSM circuit 100. This allows for a secure reboot of the AFSM circuit 100, thus mitigating any hazardous scenarios that might otherwise arise for both the device and its intended application.

A first aspect relates to a protection circuit for an asynchronous finite state machine (AFSM) circuit. The protection circuit includes a state decoder configured to generate a first state error signal in response to detecting a state fault condition associated with the AFSM circuit; a fault de-glitch subcircuit configured to receive the first state error signal and generate a second state error signal in response to the first state error signal being asserted for a duration greater than a predetermined threshold; and a set/reset register configured to generate a pulsed reset signal in response to the second state error signal being generated by the fault de-glitch subcircuit, the pulsed reset signal being asserted for a predetermined duration, and wherein the pulsed reset signal causes the AFSM circuit to be reset to a reset or idle condition.

In a first implementation form of the protection circuit according to the first aspect as such, the protection circuit further includes an output decoder configured to generate a third error signal in response to detecting an output fault associated with the AFSM circuit, where the set/reset register is further configured to generate the pulsed reset signal in response to the third error signal being generated by the output decoder.

In a second implementation form of the protection circuit, according to the first aspect as such or any preceding implementation form of the first aspect, the state fault condition corresponds to no state being asserted within the AFSM circuit.

In a third implementation form of the protection circuit, according to the first aspect as such or any preceding implementation form of the first aspect, the state fault condition corresponds to more than one state simultaneously being asserted within the AFSM circuit.

In a fourth implementation form of the protection circuit, according to the first aspect as such or any preceding implementation form of the first aspect, the predetermined duration is equal to or greater than a state transition in the AFSM circuit, where during the state transition the AFSM circuit transitions completely from a first state to a second state of the AFSM circuit, and where the first state and the second state are simultaneously active during the transition.

In a fifth implementation form of the protection circuit, according to the first aspect as such or any preceding implementation form of the first aspect, the output fault corresponds to a prohibited output of the AFSM circuit.

In a sixth implementation form of the protection circuit, according to the first aspect as such or any preceding implementation form of the first aspect, the pulsed reset signal is asynchronous.

A second aspect relates to a method for operating an asynchronous finite state machine circuit. The method includes monitoring a state fault condition associated with the AFSM circuit, wherein a state fault condition corresponds to no state being asserted within the AFSM circuit or more than one state simultaneously being asserted within the AFSM circuit; monitoring an output fault condition associated with the AFSM circuit, wherein an output fault condition corresponds to a prohibited output being generated by the AFSM circuit; and generating a pulsed reset signal in response to detecting a state fault condition for a duration greater than a predetermined threshold, detecting an output fault condition, or a combination thereof, and wherein the pulsed reset signal causes the AFSM circuit to be reset to a reset or idle condition.

In a first implementation form of the method according to the second aspect as such, during the state transition the AFSM circuit transitions completely from a first state to a second state of the AFSM circuit, and where the first state and the second state are simultaneously active during the transition.

In a second implementation form of the method, according to the second aspect as such or any preceding implementation form of the second aspect, the pulsed reset signal is asynchronous.

In a third implementation form of the method, according to the second aspect as such or any preceding implementation form of the second aspect, the pulsed reset signal is asserted for a predetermined duration.

In a fourth implementation form of the method, according to the second aspect as such or any preceding implementation form of the second aspect, the predetermined duration is programmable.

In a fifth implementation form of the method, according to the second aspect as such or any preceding implementation form of the second aspect, the AFSM circuit operates under a one-hot coded architecture.

A third aspect relates to a system that includes an asynchronous finite state machine (AFSM) circuit comprising a plurality of states; and a protection circuit coupled to the AFSM circuit, the protection circuit comprising: a state decoder configured to generate a first state error signal in response to detecting a state fault condition associated with the AFSM circuit, a fault de-glitch subcircuit configured to receive the first state error signal and generate a second state error signal in response to the first state error signal being asserted for a duration greater than a predetermined threshold, and a set/reset register configured to generate a pulsed reset signal in response to the second state error signal being generated by the fault de-glitch subcircuit, the pulsed reset signal being asserted for a predetermined duration, and wherein the pulsed reset signal causes the AFSM circuit to be reset to a reset or idle condition.

In a first implementation form of the system according to the third aspect as such, the protection circuit further includes an output decoder configured to generate a third error signal in response to detecting an output fault associated with the AFSM circuit, wherein the set/reset register is further configured to generate the pulsed reset signal in response to the third error signal being generated by the output decoder.

In a second implementation form of the system, according to the third aspect as such or any preceding implementation form of the third aspect, the state fault condition corresponds to no state being asserted within the AFSM circuit.

In a third implementation form of the system, according to the third aspect as such or any preceding implementation form of the third aspect, the state fault condition corresponds to more than one state simultaneously being asserted within the AFSM circuit.

In a fourth implementation form of the system, according to the third aspect as such or any preceding implementation form of the third aspect, the predetermined duration is equal to or greater than a state transition in the AFSM circuit, wherein during the state transition the AFSM circuit transitions completely from a first state to a second state of the AFSM circuit, and wherein the first state and the second state are simultaneously active during the transition.

In a fifth implementation form of the system, according to the third aspect as such or any preceding implementation form of the third aspect, the output fault corresponds to a prohibited output of the AFSM circuit.

In a sixth implementation form of the system, according to the third aspect as such or any preceding implementation form of the third aspect, the pulsed reset signal is asynchronous, wherein the pulsed reset signal is asserted for a predetermined duration, wherein the predetermined duration is programmable, and wherein the AFSM circuit operates under a one-hot coded architecture.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A protection circuit for an asynchronous finite state machine (AFSM) circuit, the protection circuit comprising:

a state decoder circuit configured to generate a first state error signal in response to detecting a state fault condition associated with the AFSM circuit, the state fault condition corresponding to more than one state being simultaneously asserted within the AFSM circuit;

a fault de-glitch subcircuit configured to receive the first state error signal and generate a second state error signal in response to the first state error signal being asserted for a duration greater than a predetermined threshold; and a set/reset register configured to generate a pulsed reset signal in response to the second state error signal being generated by the fault de-glitch subcircuit, the pulsed reset signal being asserted for a predetermined duration, wherein the pulsed reset signal causes the AFSM circuit to be reset to a reset or idle condition.

2. The protection circuit of claim 1, further comprising an output decoder circuit configured to generate a third error signal in response to detecting an output fault associated with the AFSM circuit, wherein the set/reset register is further configured to generate the pulsed reset signal in response to the third error signal being generated by the output decoder circuit.

3. The protection circuit of claim 2, wherein the output fault corresponds to a prohibited output of the AFSM circuit.

4. The protection circuit of claim 1, wherein the state decoder circuit is configured to generate a third state error signal in response to detecting a second state fault condition associated with the AFSM circuit, wherein the second state fault condition corresponds to no state being asserted within the AFSM circuit wherein the fault de-glitch subcircuit is configured to receive the third state error signal and generate a fourth state error signal in response to the third state error signal being asserted for a second duration greater than the predetermined threshold, wherein the set/reset register is configured to generate a second pulsed reset signal in response to the fourth state error signal being generated by the fault de-glitch subcircuit, the second pulsed reset signal being asserted for the predetermined duration, and wherein the second pulsed reset signal causes the AFSM circuit to be reset to the reset or the idle condition.

5. The protection circuit of claim 1, wherein the predetermined duration is equal to or greater than a state transition in the AFSM circuit, wherein, during the state transition, the AFSM circuit transitions completely from a first state to a second state, and wherein the first state and the second state are simultaneously active during the transition.

6. The protection circuit of claim 1, wherein the pulsed reset signal is asynchronous.

7. The protection circuit of claim 1, wherein the AFSM circuit operates under a one-hot coded architecture.

8. A method for operating an asynchronous finite state machine circuit, the method comprising:

monitoring a state fault condition associated with the AFSM circuit, wherein the state fault condition corresponds to no state being asserted within the AFSM circuit or more than one state simultaneously being asserted within the AFSM circuit;

monitoring an output fault condition associated with the AFSM circuit; and generating a pulsed reset signal in response to detecting the state fault condition for a duration greater than a predetermined threshold, detecting the output fault condition, or a combination thereof, and wherein the pulsed reset signal causes the AFSM circuit to be reset to a reset or idle condition, the pulsed reset signal being asserted for a predetermined duration, wherein the predetermined duration is equal to or greater than a state transition in the AFSM circuit, and wherein a first state and a second state are simultaneously active during the transition.

9. The method of claim 8, wherein, during the state transition, the AFSM circuit transitions completely from the first state to the second state.

10. The method of claim 8, wherein the pulsed reset signal is asynchronous.

11. The method of claim 8, wherein the pulsed reset signal is asserted for the predetermined duration.

12. The method of claim 8, wherein the predetermined duration is programmable.

13. The method of claim 8, wherein the AFSM circuit operates under a one-hot coded architecture.

14. The method of claim 8, wherein the output fault condition corresponds to a prohibited output being generated by the AFSM circuit.

15. A system, comprising:

an asynchronous finite state machine (AFSM) circuit comprising a plurality of states; and a protection circuit coupled to the AFSM circuit, the protection circuit comprising:

a state decoder circuit configured to generate a first state error signal in response to detecting a state fault condition associated with the AFSM circuit, the state fault condition corresponding to more than one state being simultaneously asserted within the AFSM circuit, a fault de-glitch subcircuit configured to receive the first state error signal and generate a second state error signal in response to the first state error signal being asserted for a duration greater than a predetermined threshold, and a set/reset register configured to generate a pulsed reset signal in response to the second state error signal being generated by the fault de-glitch subcircuit, the pulsed reset signal being asserted for a predetermined duration, wherein the pulsed reset signal causes the AFSM circuit to be reset to a reset or idle condition.

16. The system of claim 15, wherein the protection circuit further comprises an output decoder circuit configured to generate a third error signal in response to detecting an output fault associated with the AFSM circuit, and wherein the set/reset register is further configured to generate the pulsed reset signal in response to the third error signal being generated by the output decoder circuit.

17. The system of claim 16, wherein the output fault corresponds to a prohibited output of the AFSM circuit.

18. The system of claim 15, wherein the state decoder circuit is configured to generate a third state error signal in response to detecting a second state fault condition associated with the AFSM circuit, wherein the second state fault condition corresponds to no state being asserted within the AFSM circuit, wherein the fault de-glitch subcircuit is configured to receive the third state error signal and generate a fourth state error signal in response to the third state error signal being asserted for a second duration greater than the predetermined threshold, wherein the set/reset register is configured to generate a second pulsed reset signal in response to the fourth state error signal being generated by the fault de-glitch subcircuit, the second pulsed reset signal being asserted for the predetermined duration, and wherein the second pulsed reset signal causes the AFSM circuit to be reset to the reset or the idle condition.

19. The system of claim 15, wherein the predetermined duration is equal to or greater than a state transition in the AFSM circuit, wherein, during the state transition, the AFSM circuit transitions completely from a first state to a second state, and wherein the first state and the second state are simultaneously active during the transition.

20. The system of claim 15, wherein the pulsed reset signal is asynchronous, wherein the predetermined duration is programmable, and wherein the AFSM circuit operates under a one-hot coded architecture.

* * * * *